S. R. THOMPSON.

Assignor, by mesne assignments, to NEW YORK BUNG AND BUSHING COMPANY.

BUNG AND BUSHING.

No. 10,368. Reissued Aug. 14, 1883.

*Witnesses:—*

W. Colborne Brookes

W. Anderson

*Inventor:—*

Same. R. Thompson by Wyllys Rodgers

Atty.

N. PETERS, Photo-Lithographer, Washington, D. C.

UNITED STATES PATENT OFFICE.

SAMUEL R. THOMPSON, OF BROOKLINE, MASSACHUSETTS, ASSIGNOR, BY MESNE ASSIGNMENTS, TO NEW YORK BUNG AND BUSHING COMPANY, OF NEW YORK, N. Y.

BUNG AND BUSHING.

SPECIFICATION forming part of Reissued Letters Patent No. 10,368, dated August 14, 1883.

Original No. 141,473, dated August 5, 1873; Reissue No. 8,483, dated November 12, 1878. Application for reissue filed July 24, 1883.

*To all whom it may concern:*

Be it known that I, SAMUEL R. THOMPSON, formerly of Portsmouth, in the State of New Hampshire, and now of Brookline, in the State of Massachusetts, have invented certain Improvements in Bushings for Faucet-Holes, of which the following is a specification.

Figure 1:
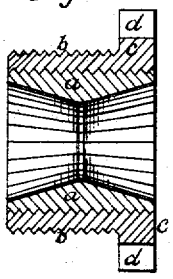
Figure 2:
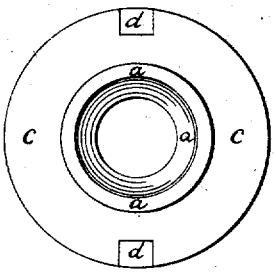

Figure 1 of the accompanying drawings is a central vertical longitudinal section, and Fig. 2 an end view, of my improved bushing.

The present invention relates to certain new and useful improvements in bushings for faucet-holes of barrels, &c., having for their principal object the production of a simple, economical, and effective bushing that will admit of the easy adjustment and withdrawal of the faucet without injury to the barrel, and that may be readily and cheaply replaced when worn.

My improvements consist, mainly, of a bushing of wood, &c., constructed and arranged, as will be hereinafter more fully described, so as to receive and hold and allow of the yielding either way of a faucet, which, when slightly struck, is readily withdrawn from the bushing without detriment to the barrel.

In the drawings, *a* represents a bushing of wood formed of a tapering shape, with exterior screw-threads, the interior periphery tapering from each end toward the center, where the junction or apex of the bevels forms a bearing which securely holds a faucet when driven into the bushing *a*, whose double-beveled interior allows the yielding in any direction of the faucet, which, when slightly struck, is readily loosened and withdrawn without injury to the barrel, &c. The bushing *a* is screwed within a metal or other suitable casing, *b*, of a tapering shape, formed on the outer and inner periphery with screw-threads, and at the outer end or mouth with a lip or flange, *c*, notched, as at *d*, or otherwise arranged to receive a key or wrench for turning the casing *b* in or out of the barrel, &c.

By the above description, reference being had to the drawings, it will be seen that the bush *a*, being of wood, is of but little expense, and, being formed with screw-threads, may be readily screwed out of the casing *b* when worn, and replaced with but little trouble or cost, and that by the double-beveled formation of the interior of the bush *a* the faucet is securely held, and yet allowed to render freely in either direction when slightly struck, so as to be loosened and easily withdrawn from the bushing *a* without detriment to the barrel, &c., thus saving much expense heretofore incurred by the splitting of or other injury to the barrel-head when pounded to release the faucet as ordinarily adjusted.

In my original specification I mentioned the use of other material than wood for the bushing *a*. This I desire now to disclaim, and confine my invention to wood alone, in combination with the protecting casing *b*, or to the casing *a*, of wood alone, when made with the interior bevels.

In practice it will be found that the wood casing *a* will yield sufficiently to allow the ready withdrawal of the faucet, even without the bevels; but they facilitate the operation, and I regard them therefore as one of my said improvements; and it is practicable also to remove the bushing *a*, even when not screw-threaded.

Having thus fully described my improvement, what I claim as my invention, and desire to have secured by Letters Patent, is—

1. The combination of a wooden bushing, *a*, and casing *b*, constructed and arranged as described, and for the purposes specified.

2. The wooden bushing *a*, constructed with interior bevels, substantially as described, in combination with the casing *b*.

In testimony whereof I have signed my name to this specification in the presence of two witnesses.

SAMUEL R. THOMPSON.

Witnesses:
JON. F. BARRETT,
GEORGE CLARENDON HODGES.